COHERENT MEMORY FILTER

Filed June 9, 1958 4 Sheets-Sheet 1

INVENTORS
ROBERT I. BERNSTEIN
HENRY J. BICKEL
BY George Larounis
ATTORNEY

COHERENT MEMORY FILTER

Filed June 9, 1958

INVENTORS
ROBERT I. BERNSTEIN
HENRY J. BICKEL
BY George Larounis
ATTORNEY

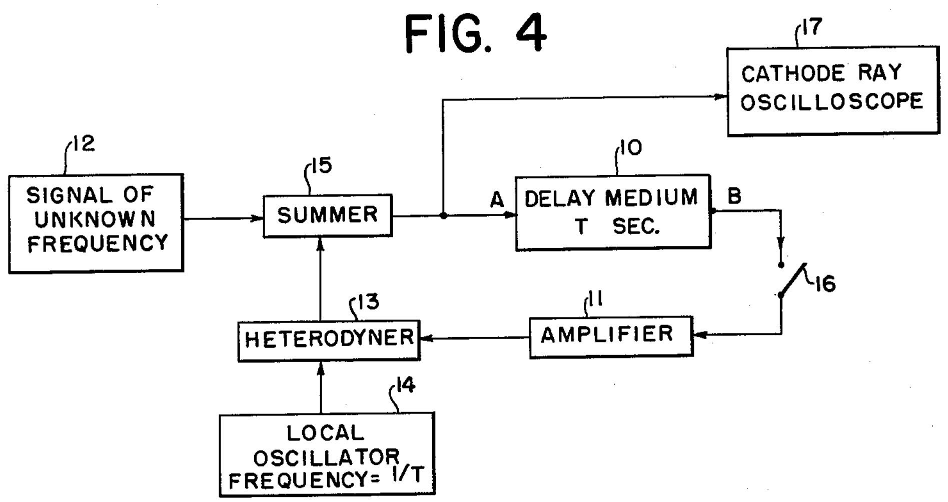
FIG. 5
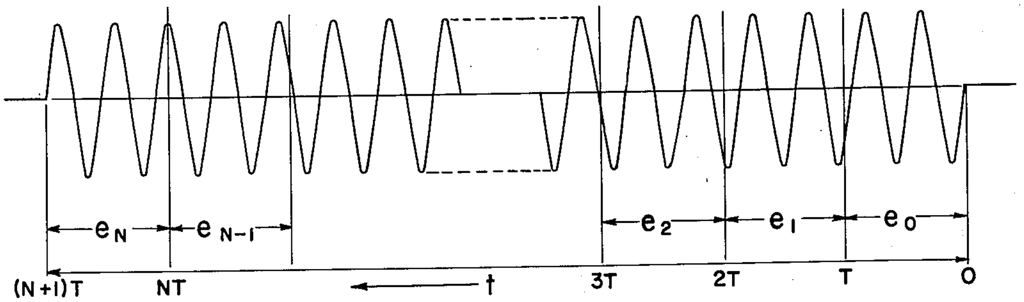
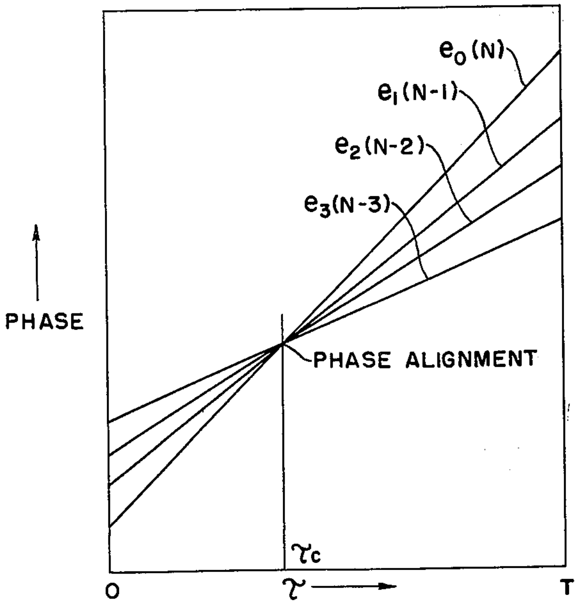
FIG. 6
INVENTORS
ROBERT I. BERNSTEIN
HENRY J. BICKEL
BY George Larounis
ATTORNEY Dec. 12, 1961 H. J. BICKEL ET AL 3,013,209

COHERENT MEMORY FILTER

Filed June 9, 1958 4 Sheets-Sheet 4

INVENTORS
ROBERT I. BERNSTEIN
HENRY J. BICKEL
BY George Laroumes
ATTORNEY 3,013,209

COHERENT MEMORY FILTER

Henry J. Bickel, New York, N.Y. (49 Northway, Bronxville, N.Y.) and Robert I. Bernstein, 137 Riverside Drive, Bronx 24, N.Y.

Filed June 9, 1958, Ser. No. 740,796
15 Claims. (Cl. 324—77)

The present invention relates to signal identification, and more particularly to a method and apparatus wherein within a single device, which may be instantaneously cleared to be available for successive operations, a signal or a multiplicity of simultaneous signals or signal components present within a wide frequency spectrum may be operated upon essentially simultaneously to effect signal detection, signal-to-noise ratio enhancement, measurement of all signal parameters, and spectral or Fourier signal analysis. Further, the results of the above operations may be presented as a mapping of the frequency domain into the time domain so that signals of different frequencies are presented at separate instants of time.

Various signal-identifying devices are known to the art. For example, an L-C circuit having a high Q is capable of enhancing the signal-to-noise ratio of a signal whose carrier frequency is known. This is because the signal-enhancing, coherent integration of an input signal plus noise, which takes place within an L-C circuit produces a strong output response only if the resonant frequency of the circuit is the same as, or very close to, the carrier frequency of the signal. Other resonant elements, such as crystals and other mechanically resonant structures, perform in the same manner and may be used in place of a simple, high Q, L-C circuit.

Resonant elements of this nature have been employed heretofore in devices known generally as spectrum analyzers. Such devices are adapted to investigate a preselected frequency spectrum to detect and identify signals present therein. To this end the system must employ a plurality of resonant elements since each element can respond to an extremely limited frequency band only. Thus, each element is tuned to a different frequency so that the entire spectrum of interest may be investigated. The signal, or signals, are in this manner simultaneously applied to all the resonant elements, the information desired being deduced by observing which of the resonant elements produce an output. The actual number of resonant elements employed depends upon the fineness of frequency resolution required and the width of the spectrum under investigation. For example, in an actual system in operation as many as 420 resonant elements are employed.

It is ordinarily necessary to provide a means of inspecting all of the resonant elements in a very short time in order to determine which of them have produced outputs. This is normally done by commutating the output to a central observation device. The commutators employed in such application have been extremely unsatisfactory in operation and need constant maintenance due to the required minute mechanical tolerances. Further, the ratio of maximum-to-minimum signal strength which can be simultaneously accommodated by the commutator is frequently inadequate because of the level of background pickup voltage produced in the commutator by strong signals.

An additional separate problem lies in that the resonant elements employed require a relatively long time to be cleared after each integration in order to be able to effect a successive operation. This limitation is extremely disadvantageous if high repetition rate operation is required. Often, in such instances, a separate bank of resonant elements must be employed so that one such bank may be cleared while the other is in operation.

A device known to the art which is of interest in this respect is characterized as a delay line filter. One embodiment of such a device employs a delay medium in a closed loop, the net gain around the loop, including the various attenuations and amplifications, being substantially unity. Coherent integration occurs within such a device if the input to the loop is a sinusoid whose period is exactly equal to the loop delay. This results because each cycle of the signal completes a transit around the loop in exactly one sinusoidal period and arrives at the summation point at exactly the right instant to combine in phase with the next cycle of the input signal. With the passage of each delay period, therefore, the voltage circulating in the loop acquires an additional increment equal to the amplitude of the input signal. This same increase will also occur if the input signal possesses a period equal to, or very nearly equal to, an exact integral submultiple of the loop delay, but not otherwise.

The delay line filter may therefore be employed as a substitute for the resonant devices above described. Further, it has an important advantage thereover in that it may be restored to its original uncharged condition and made available for a succeeding operation by reducing its loop gain to zero for a single delay period. Since a delay period is normally very much shorter than the total integration time, this is tantamount to essentially instantaneous clearing of the device in readiness for successive operations. However, the delay line filter is subject to the disadvantage of the resonant devices in that it is responsive only to a particular frequency or its harmonics. Spectro-analytic devices utilizing this delay line filter must therefore employ the disadvantageous plurality technique heretofore described in order to investigate a spectrum of interest. The cost of a delay line filter, however, makes this type of utilization prohibitive.

Accordingly, it is one of the objects of the present invention to provide a method and apparatus wherein a relatively compact and inexpensive coherent memory filter, not requiring a duplication of identical circuit elements, may be employed to investigate a frequency spectrum of interest, to detect and identify signals present therein, and to provide signal-to-noise ratio enhancement thereof, all with the same accuracy heretofore producible by spectrum analyzers.

Further, it is another object of the present invention to provide a method and apparatus wherein the coherent memory filter may be adapted to operate simultaneously over the entire spectrum of interest to produce a presentation of signal frequency versus time thereby to eliminate the use of a commutator.

It is still another object of the present invention to provide a method and apparatus whereby the coherent memory filter may be instantaneously cleared in readiness for successive operations.

Another spectro-analytic device known to the art is variously called a panoramic analyzer or wave analyzer depending upon its forms. This device utilizes a single narrow bandwidth circuit which is resonant at a fixed frequency. The spectrum which is to be investigated is then presented to the narrow bandwidth circuit in a sequential manner by means of a frequency converter adapted to heterodyne the spectrum under investigation to the fixed resonant frequency. In this manner, a response at the output of the resonant narrow bandwidth circuit is indicative of the presence of a signal within the spectrum having a frequency equal to that which the converter has heterodyned into the coverage of the resonant circuit at the moment of response.

This type of device is subject to a number of disadvantages. The scanning of a spectrum under investi- ;ation with this device consumes a relatively long period ›f time since the scanning speed must be slow enough to ›ermit the resonant circuit to respond to any signal ›resent. Further, there may be signals in the spectrum vhich persist only briefly. In that event, it is likely that he signal will not be heterodyned to the fixed resonant requency at the correct time so that such brief signals vill often remain undetected. These disadvantages are ;ompletely eliminated in the present invention in that the nethod and circuitry provided operate in an essentially imultaneous manner on the entire spectrum of interest vhile providing comparable investigation thereof.

To effect these ends the present invention provides a ;oherent memory filter in which signal processing is ;ffected by applying the signal to a memory portion of he filter to be stored therein. In this way the filter nay be adapted to simultaneously present a multiplicity )f stored signal reproductions of the input signal, which ;tored signals are successively delayed by preselected ime intervals. These stored signals are then combined o cause wave interference producing an output signal. Simultaneously with such combination, the phase of each )f the multiplicity of stored signals is adjusted in synchronism in search for amplitude peaks in the envelope of he output signal, these amplitude peaks being caused by phase alignment or, i.e., constructive wave reinforcement.

In accordance with the present invention each instance )f such constructive wave reinforcement as signaled by ın amplitude peak in the output signal is representative )f a sinusoidal frequency component of the input signal. Further, such constructive wave reinforcement produces coherent integration with resultant signal-to-noise ratio enhancement. And still further, the amount of phase adjustment required to produce an amplitude peak in the output signal is indicative of the frequency of the component causing that amplitude peak.

Thus, if a single sinusoidal input signal is present within a spectrum under investigation, one such instance of wave reinforcement and one amplitude peak in the output signal will occur. If, however, a number of sinusoidal input signals of different frequency are present, a corresponding number of instances of wave reinforcement, and therefore of amplitude peaks, will occur. A measurement of the amount of phase adjustment required for each instance of wave reinforcement will result in an indication of the frequencies of all the signals present within the spectrum. This same method may be employed in effecting a Fourier analysis of a complex signal. In such an analysis the instances of wave reinforcement will be representative of the component sinusoidal frequencies making up the complex signal.

It should also be noted at this time that the amplitude of an envelope peak in the output signal is representative of the amplitude of the input signal causing that peak. Further, the carrier of the envelope retains the phase of the input signal. Thus, the invention provides an indication of all the parameters of the input signals.

The invention also provides a preferred method for measuring the amounts of phase adjustment required to produce wave reinforcement. This method results in a mapping of the frequency domain into the time domain with resultant ease and clarity of presentation. In this preferred method the phase of each of the multiplicity of stored signals is adjusted in synchronism at a specified rate, the rate for each stored signal being a linear function of the time delay experienced by that stored signal, the linear function for all signals being the same. According to the invention wave reinforcement upon combination of these phase-adjusted signals will occur at instants of time indicative of the frequency components of the input signal. In this way, the amplitude peaks in the output signal may be referenced to a time scale thereby to effect a presentation wherein the instant of occurrence of each amplitude peak is indicative of the frequency of the signal causing that peak.

The present invention also provides preferred apparatus whereby processing of input signals as specified may be effected. One embodiment of such apparatus comprises a delay medium having a multiplicity of outputs. This delay medium is adapted to produce at each output a stored reproduction of a signal input, the multiplicity of stored signals thus produced being successively delayed by preselected time intervals. A corresponding multiplicity of synchronized phase shifting means are then provided, each connected to a separate and different delay medium output respectively to be responsive to the stored signal thereat. Each phase shifting means is adapted to adjust the phase of the stored signal applied thereto at a rate which is a linear function of the time delay experienced by that stored signal, the linear function for all stored signals being the same. The apparatus is completed by means of summing circuitry connected in common to the outputs of all of the phase shifting means to combine the phase-adjusted stored signals produced thereby. In this way the output signal of the summing circuit is the result of wave interference of the combined phase-adjusted stored signals. Thus, as hereinbefore described, wave reinforcement manifested by amplitude peaks in the summing circuit output signal will occur at instants of time indicative of the frequency components contained in the input signal.

The invention also provides apparatus whereby signal processing as specified may be effected within a single, relatively compact and inexpensive device not requiring a duplication of identical circuit elements. Such apparatus comprises a storage loop having a delay time T. Means are provided for applying the signal to be processed to the storage loop. Phase shifting means are also provided. The phase shifting means are adapted to adjust in synchronism the phase of equal successive portions of the input signal, the duration of the portions being equal to $T/K$, where K is any positive integer, at a rate of change equal to a constant plus an integral multiple of $n/T$, where $n$ is an integer representative of the order in succession of the signal portion being adjusted. In this manner the input signal entering the loop is continuously combined with stored phase-adjusted signals in the loop. Further, the combined signals are properly phase-adjusted so that signal processing as specified takes place.

In a preferred embodiment of such apparatus the phase shifting means is connected within the storage loop. This phase shifting means is adapted to adjust the phase of the input signal passing through the loop upon each circulation therethrough at a rate of change which is a multiple of the reciprocal of the storage loop delay time. After a preselected multiplicity of circulations a combination of a corresponding multiplicity of stored, properly phase-adjusted signals thus takes place.

In another form of such apparatus the phase shifting means is connected to be responsive to the input signal. This phase shifting means is adapted to adjust in synchronism the phase of the input signal during successive equal time intervals T at a rate equal to $$K_1 - \frac{K_2 n}{T}$$

where:

$n$ is the number of complete elapsed time intervals T,
$K_1$ is any number, and
$K_2$ is an integer.

The apparatus is also provided with a storage loop having a delay time $K_3T$, where $K_3$ is any positive integer. Means are then provided for applying the phase-adjusted output of the phase shifting means to the storage loop. In this manner a multiplicity of properly phase-adjusted signals combine in the storage loop to produce the specified coherent signal processing.

The invention can best be understood by referring to the following drawings in which:

FIG. 4 is a block diagram of an alternate embodiment of a coherent memory filter in accordance with the invention;

FIG. 5 is a graphical representation of an input signal as applied to the coherent memory filter of FIG. 4;

FIG. 6 is a graphical representation illustrating phase alignment in the coherent memory filter of FIG. 4;

Figure 1:
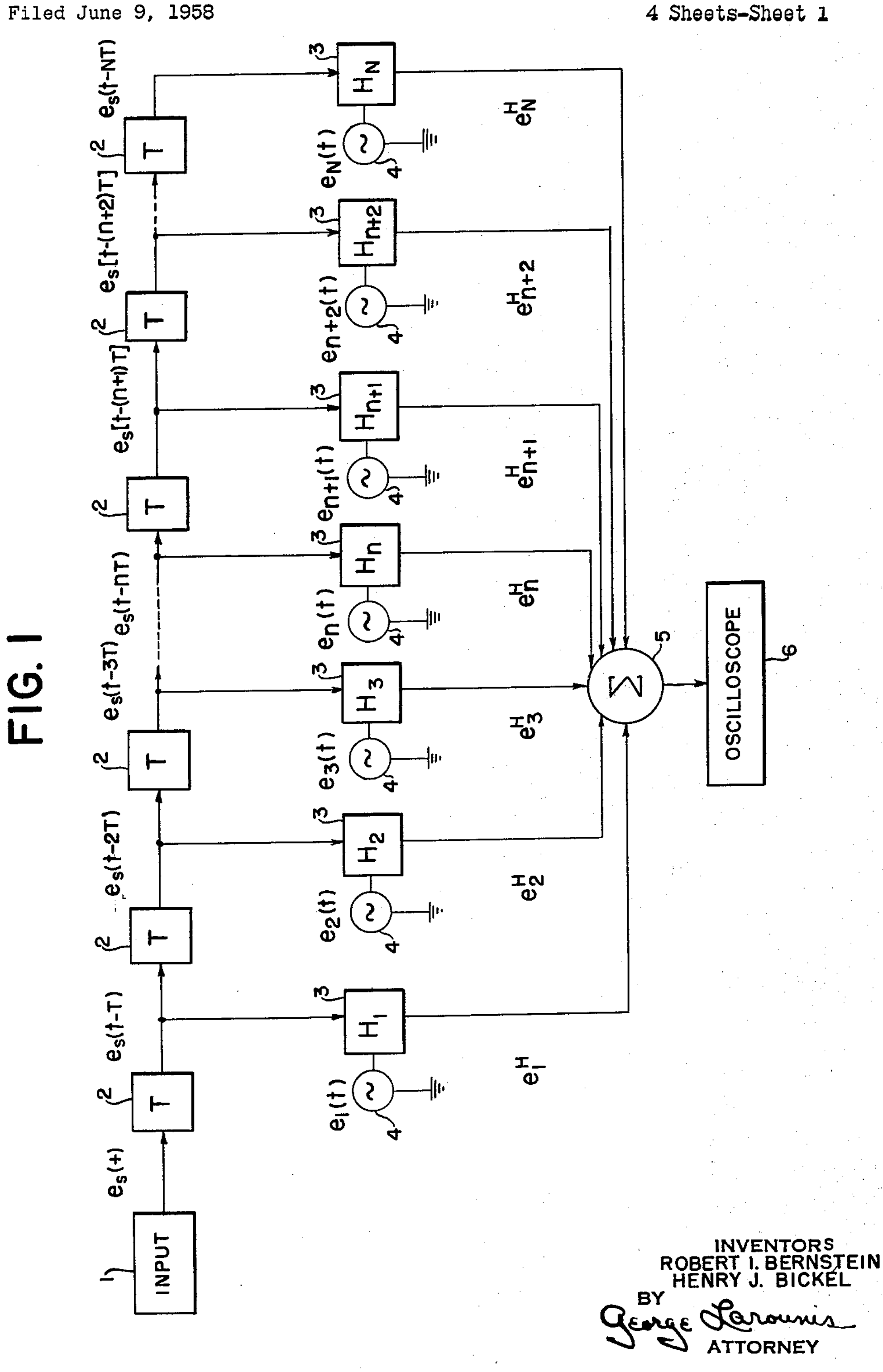
FIG. 1 is a block diagram of a coherent memory filter in accordance with the invention.

The present invention may best be described with reference to FIG. 1. The embodiment described therein comprises a long delay line having a multiplicity of outputs. Circuit means 1 are provided for applying an input signal to be processed to the long delay line. The delay line is adapted to produce at each of its outputs a stored reproduction of the input signal, the multiplicity of stored signals thus produced being delayed by different preselected time periods. Such a delay line is schematically illustrated in FIG. 1 by a multiplicity of series-connected storage units 2 having output means connected between adjacent units. Preferably the stored signals produced at the outputs of the delay line are successively delayed by equal time intervals T. Thus any of the stored signals may be represented as $e_s(t-nT)$, where $n$ is the number of time intervals T by which the signal has been delayed. A description of a long delay line suitable for utilization in the invention may be found in Electronic Design, February 19, 1958, or in an article by D. L. Arenberg entitled "Ultrasonic Delay Lines" in the 1954 Convention Record of the Institute of Radio Engineers.

In its preferred embodiment, the invention specifies that the phase of each of the multiplicity of stored signals be adjusted at a rate which is a preselected linear function of the time delay experienced by that stored signal, the linear function for all signals being the same. In addition, the invention specifies that these phase adjustments be synchronized. As employed in this specification and in the appended claims, synchronization is defined as follows: the total amount of phase adjustment experienced by each stored signal at any instant of time equals $j2\pi$ plus a linear function of the time delay experienced by that stored signal, where $j$ equals any integer or zero, and where the linear function for all signals is the same.

Figure 2:
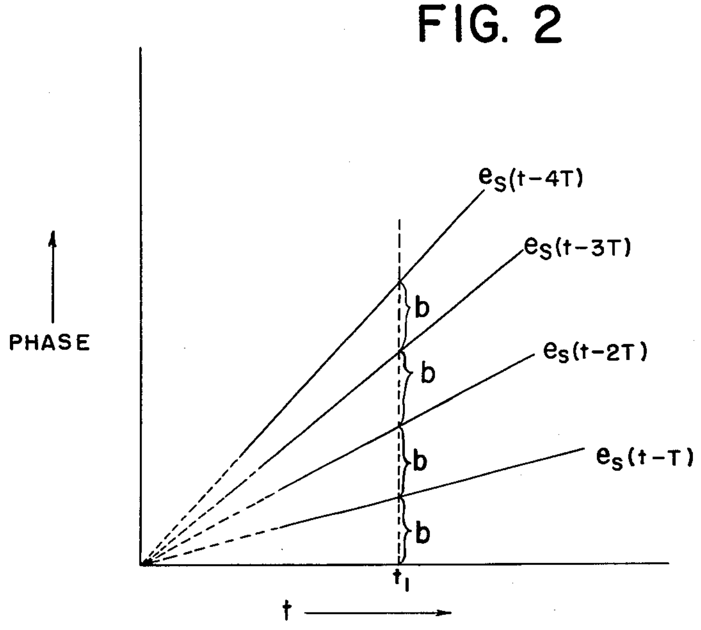
FIG. 2 is a graphical representation of phase synchronization as defined in the invention.

FIG. 2 graphically illustrates the phase adjustment experienced by each signal stored in the coherent memory filter of FIG. 1 in accordance with the invention. Because FIG. 1 is a special case in which equal intervals of time delay have been selected between successive stored signals, the rates of phase adjustment are separated by equal increments. All of the phase characteristics also pass through a common origin so that synchronization as prescribed may be effected. In the special case of FIG. 1, at any instant of time $t_1$ the stored signals are separated from each other in terms of phase adjustment by equal intervals $b$.

To effect the phase adjustments as specified a separate and different phase shifting means is connected to each of the outputs of the delay line. Preferably these phase shifting means comprise heterodyning circuits 3 having phase adjustment signals from local oscillators 4 applied thereto. Such heterodyning circuits are well known in the art, and a description thereof may be found in chapter 10, Radio Engineering, 3rd edition, by Frederick Terman, published by McGraw-Hill. In order to comply with the rate of phase adjustment specified by the invention the frequency of each local oscillator is selected to be a linear function of the time delay experienced by the stored signal applied to the heterodyner associated therewith, the linear function for all the stored signals being the same. Further, the phase adjustment signals are synchronized so that at some instant in time they all simultaneously pass through the same phase angle, thus to effect the proper synchronization of phase adjustments.

The multiplicity of signals out of the heterodyners are then combined. This may be effected by connecting conventional summing circuitry 5 in common to the outputs of the heterodyners 3. The stored signals thus combined cause wave interference producing an output signal. In accordance with the invention the phase adjustments of the multiplicity of stored signals thus combined cause phase alignment or constructive reinforcement in the output signal at certain instants of time.

Figure 3:
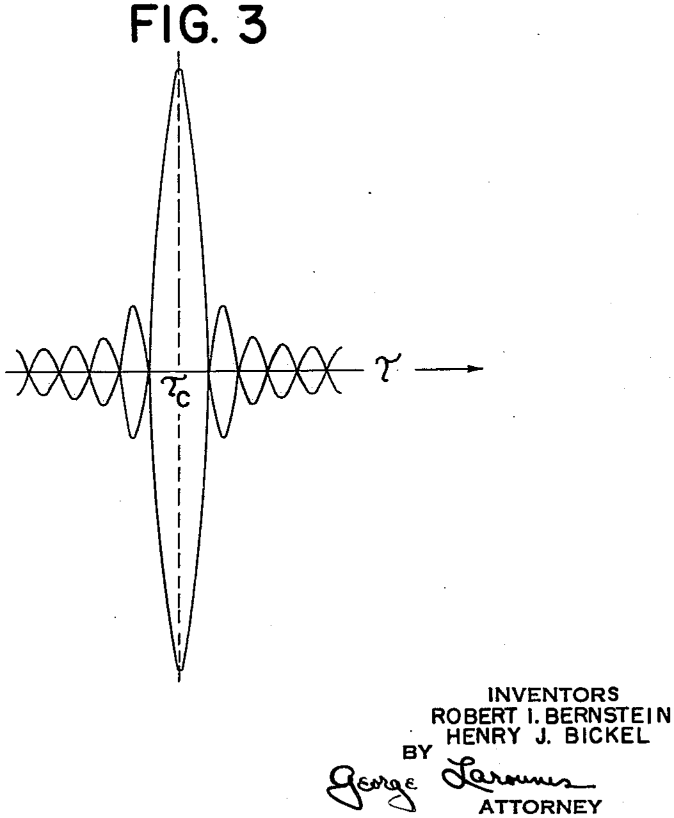
FIG. 3 is a representation of a typical output signal produced by a coherent memory filter in accordance with the invention.

In the general case the amounts of phase adjustment of the stored signals required to produce such phase alignments are indicative of the frequency components of the input signal. By the general case is meant adjusting the phase of the multiplicity of stored signals in synchronization only, without attention to the rate of phase adjustment. Normally, however, it is difficult to measure the amounts of phase adjustment of the stored signals. For that reason the invention also specifies the rate of phase adjustment. Such rate provision provides mapping of the frequency domain into the time domain. Thus the instants of time during which constructive reinforcement occurs become indicative of the frequency components of the input signal. Since phase alignment or constructive reinforcement results in amplitude peaks in the envelope of the output signal, these instants of time may be easily observed by connecting an oscilloscope 6 to the output of the summing circuit. The envelope of a representative output signal is illustrated in FIG. 3.

An important contribution of the invention lies not only in that frequency determination is provided but also in that coherent integration of the input signal takes place during the instants of phase alignment. Thus the signal-to-noise ratio of the input signal is materially improved. This signal enhancement is reflected in the envelope peak of the output signal and is related to the number of stored signals provided by the delay line for combination in the summing circuitry. That is to say, the greater the number of stored signals thus provided the larger and sharper the amplitude peak.

That the coherent memory filter of the invention functions as stated may be proved in the following manner. For simplicity of explanation it may be assumed that an input signal of sinusoidal form is applied to the coherent memory filter. Since all the networks comprising the filter are linear, the principle of superposition may be employed to prove the performance of the device in the presence of a complex signal containing many frequency components. Each of the multiplicity of stored signals produced by the delay line may then be represented in the form:

$$e_s(t-nT)$$

where: $n$ is an integer equal to the number of delays T experienced by the stored signal.

Each of these stored signals is applied to its associated heterodyner. As is well known the phase at the output of a heterodyner is the sum or difference of the phases of its two inputs, in accordance with the circuitry provided. Therefore, each of the heterodyners adjusts the phase of the stored signal applied thereto by virtue of the phase adjustment signal provided.

Because the input signal is a sinusoid it may be represented as:

$$e_s(t)=E\cos(\omega t+\alpha) \quad (1)$$

where:

$E$=the peak amplitude of the input signal,
$\omega$=the radian frequency of the input signal, $t$=the time variable, and
$\alpha$=an arbitrary phase angle.

The delayed reproductions of the input signal are therefore:

$$e_s(t-nT)=E\cos(\omega t-n\omega T+\alpha);\ t\geqq nT \quad (2)$$

where:

$T$=time delay
$n$=1, 2, 3 . . . N, and
$N$=an integer denoting the number of stored signals provided by the delay line.

It will be noted that the amplitude E is unaffected by the length of storage. Advantageously the amplitude is so maintained in the delay line, though the invention is not so limited.

In this embodiment each of the heterodyners, $H_1$, $H_2$ . . . $H_N$ has been adapted so that its output is the "sum" phase of its two inputs. Assuming the phase adjustment signal input to $H_1$ to be of unity amplitude, then:

$$e_1(t)=\cos(\omega_d t) \quad (3)$$

where:

$$\omega_d=\frac{2\pi}{T}$$

as prescribed by the invention in its preferred embodiment. The choice of $2\pi$ as a constant is for the sake of convenience. It then follows that:

$$e_2(t)=\cos(2\omega_d t)$$
$$e_3(t)=\cos(3\omega_d t)$$
$$\vdots$$
$$e_n(t)=\cos(n\omega_d t)$$

Thus from Equations 2 and 3 the outputs of the heterodyners may be represented as:

$$e_n^H=E\cos[(\omega+n\omega_d)t-n\omega T+\alpha];\ t\geqq nT \quad (4)$$

The output of the summing circuit 5 which is the combined output of the N heterodyners may therefore be represented as:

$$E_{OUT}^N(t)=\sum_{n=1}^{N}e_n^H;\ t\geqq NT \quad (5)$$

It can now be shown that at certain instants of time, phase alignment of all the signals contained in Equation 5 occurs, and that these instants are indicative of the frequency of the input sinusoid.

To provide such proof, let the time variable $t$ be expressed as:

$$t=\tau+mT \quad (6)$$

where:

$\tau$=cyclic time, and
$m$=0, 1, 2, 3 . . . $\infty$

Also let the input signal frequency be expressed in the form:

$$\omega=k\omega_d+\omega' \quad (7)$$

where:

$$\omega_d=\frac{2\pi}{T}$$

$k$=the largest integer for which $0\leqq[\omega-k\omega_d]<\omega_d$, and $0\leqq\omega'<\omega_d$ Therefore the phase difference between $$e_{n+1}^H \text{ and } e_n^H$$

is from Equations 4, 6, and 7:

$$\phi_D=\omega_d(t-\omega)T \quad (8)$$
$$=\omega_d\tau-\omega'T+(\text{multiple of } 2\pi) \quad (8a)$$

By definition, however, $\omega'T<2\pi$, and $\omega_d\tau<2\pi$. Thus $\phi_D$ is equal to a multiple of $2\pi$ when $$\omega_d\tau-\omega'T=0 \quad (9)$$

Since two sinusoidal signals are in phase alignment when their phases differ by zero or a multiple of $2\pi$, the instant of cyclic phase alignment is obtained by solving for the critical value of $\tau$, or $\tau_c$, which satisfies Equation 9 as follows:

$$\tau_c=\frac{\omega' T}{\omega_d} \quad (10)$$

It will be seen that Equation 10 is obtained independently of $n$. Thus, phase alignment of all the signals contained in Equation 5 takes place at $\tau=\tau_c$. Furthermore $\tau_c$ is a linear function of $\omega'$. This proves, therefore, that phase alignment occurs at instants of time indicative of the frequency of the input signal. It will be noted, however, that the coherent memory filter functions unambiguously only over a frequency range $1/T$.

The coherent memory filter of the invention may also be employed to process a multiplicity of simultaneously present sinusoidal signals or complex signals containing a number of frequency components, since the device will function identically as described upon all signals applied thereto. Further, the parameters of amplitude and phase of the input are preserved in the output signal provided. This may be proved by expressing the sum of the signals comprising Equation 5 in its closed form. Such expression is:

$$E_{OUT}^N=AE\cos(\omega_0\tau+\phi_0) \quad (11)$$

where:

$$A=\left\{\frac{\sin\frac{1}{2}(N+1)(\omega_d\tau-\omega' T)}{\sin\frac{1}{2}(\omega_d\tau-\omega' T)}\right\}$$

$$\omega_0=\frac{N}{2}\omega_d+k\omega_d+\omega'$$

$$=\frac{N}{2}\omega_d+\omega$$

$$\phi_0=-\frac{N}{2}\omega' T+\omega' nT+\alpha$$

Inspection of Equation 11 shows that the amplitude AE of the output signal is proportional to amplitude E of the input signal. Further it will be seen that $\phi_0$ contains the phase angle $\alpha$ of the input signal modified by a constant only. Because the parameters of amplitude, phase, and frequency of the input signal are preserved in the output signal of the coherent memory filter, Fourier analysis may be accomplished.

Inspection of Equation 11 also shows that the signal represented thereby is of the form of an amplitude modulated sinusoid of frequency $\omega_0$ and phase $\phi_0$. The amplitude modulation factor A is the envelope of the output signal as shown in FIG. 3. From an inspection of the amplitude factor A, it can be seen that the envelope of the output signal achieves its maximum amplitude at the instant of phase alignment $\tau_c$. At that instant the magnitude of A is $N+1$, substantiating that linear addition of the signals applied to the summing circuit does occur. At the same time the noise components accompanying the signals will combine statistically in a random manner. Thus it will be seen that at the instant of time $\tau_c$ coherent integration and therefore signal enhancement takes place.

Due to the characteristics above described the coherent memory filter of the invention is admirably suited for use as a spectrum analyzer. In such function the spectrum to be investigated is applied to the input of the device. Since signal-to-noise ratio enhancement is accomplished, signal detection is facilitated. Further, all the parameters of the detected signals are susceptible of identification.

The present invention also provides apparatus whereby the method above outlined may be accomplished within a single, relatively compact and inexpensive coherent memory filter device not requiring a duplication of identical circuit elements, such as, for example, the multiplicity of phase shifting means employed in the apparatus of FIG. 1.

The basic block diagram of a preferred form of such a coherent memory filter appears in FIG. 4. The device comprises a storage loop having a preselected delay time, T seconds. This delay time may be provided by means of a variety of media, for example, a magnetic drum, magnetic tape, electronic or ultrasonic delay lines, and the like. Such a delay medium is represented by block 10. The storage loop may then be constructed by connecting a feedback loop from the output B of the delay medium to the input A thereof. Preferably there should be a unity net gain around the storage loop. To this end an amplifier 11 having a gain preselected to achieve unity net gain around the storage loop is connected within the feedback loop.

The input signal to be processed is applied to this storage loop as schematically indicated by block 12. The invention provides that the phase of this input signal be adjusted as it passes through the loop upon every circulation therethrough at a rate of change which is a multiple of the reciprocal of the storage loop delay time, conveniently $1/T$. To this end the invention provides phase shifting means in the feedback loop. Preferably this phase shifting means comprises a heterodyner 13 having a local oscillator 14 applying a phase adjustment signal thereto. In order to adjust the phase of the input signal at the specified rate of change, the frequency of the phase adjustment signal from the local oscillator must also be a multiple of the reciprocal of the storage loop delay time. In this case the frequency of the local oscillator is set equal to $1/T$.

By this means stored phase-adjusted signals are continuously circulating through the storage loop and are continuously being combined with the input signal also entering the storage loop. Summing circuitry 15 connected between the output of the phase shifting means, heterodyner 13, and the input of the delay medium is ordinarily provided to effect such combination. Means, such as a cathode ray tube oscilloscope 17, is connected to the storage loop in order to observe the output signal provided by this combination.

In accordance with the invention the coherent memory filter of FIG. 4 produces constructive wave reinforcement, represented by amplitude peaks in the envelope of the output signal at the oscilloscope, at certain instants of time during each circulation period. Further coherent integration of the input signal takes place at these instants, the instants themselves being indicative of the frequency components of the input signal. Thus signal processing as hereinbefore described is effected.

To explain how the apparatus of FIG. 4 accomplishes such signal processing, reference is made to FIG. 5 where a sinusoidal signal $e$ of unknown frequency is illustrated, which signal is applied to the coherent memory filter. Signal $e$ may be considered to be composed of portions $e_0, e_1, e_2 \ldots e_n \ldots e_N$, where each is of a duration T, the delay time of the storage loop. Each such portion may therefore be expressed as:

$$e_n = E \cos [\omega(\tau + nT) + \alpha]$$

where:

$\alpha$=an arbitrary phase angle, $$0 \leqslant \tau < T$$

$T$=the time delay of the storage loop, $n$=an integer, 0, 1, 2, 3, . . . N, representative of the order in succession of the signal portions, and $\omega$=the radian frequency of the unknown signal.

It has been indicated that the frequency of the local oscillator phase adjustment signal is:

$$f_d = 1/T$$

or $$\omega_d = 2\pi/T$$

For convenience in explanation FIG. 5 represents signal $e$ in a manner such that the processing thereof in the coherent memory filter begins at $n=0$ and $\tau=0$, and so that whenever $\tau=0$ the phase of the phase adjustment signal goes through zero with a positive slope.

Considering that portion of the signal $e$ which lies between 0 and T, such portion may be characterized as:

$$e_0 = E \cos (\omega\tau + \alpha)$$

This portion $e_0$ circulates around the storage loop once each time period T, and during each circulation around the loop its frequency is increased by $\omega_d$ through the medium of the phase shifting means. Thus the output of the phase shifting means due to $e_0$ following, for example, the Nth circulation may be represented as:

$$e_0(N) = E \cos [(\omega + N\omega_d)\tau + \alpha]$$

This same situation prevails for the other portions of the signal $e$, except that each succeeding portion is circulated around the storage loop one less time than is the preceding portion. Thus, for example, the output of the phase shifting means, after N circulations of $e_0$, due to portion $e_1$ would be:

$$e_1(N-1) = E \cos \{[\omega + (N-1)\omega_d]\tau + \omega T + \alpha\}$$

while the output due to portion $e_2$ would be:

$$e_2(N-2) = E \cos \{[\omega + (N-2)\omega_d]\tau + 2\omega T + \alpha\}$$

and so on.

It will therefore be seen that the phase of each stored portion of the input signal is adjusted at a rate which is a linear function of the total time delay (i.e. the number of circulations) experienced by that signal portion, the linear function for each portion being the same. It is evident that the phase adjustments are synchronized as well since all signal portions are adjusted in phase by the same increment during each circulation.

By referring to FIGS. 4 and 5 it will be seen that after N circulation periods have occurred the phase-adjusted signal portions in the loop are combined with the as yet unprocessed signal portion $e_N$. The output signal at the oscilloscope 17 may therefore be represented as the sum of the signal portions taking into consideration their phase adjustments, as follows:

$$\begin{aligned} e^N_{OUTPUT} = {} & E \cos [(\omega + N\omega_d)\tau + \alpha] + \\ & E \cos \{[\omega + (N-1)\omega_d]\tau + \omega T + \alpha\} + \\ & E \cos \{[\omega + (N-2)\omega_d]\tau + 2\omega T + \alpha\} + \\ & \quad \cdot \quad \cdot \quad \cdot \quad \cdot \quad \cdot \\ & E \cos \{[\omega + (N-n)\omega_d]\tau + n\omega T + \alpha\} + \\ & \quad \cdot \quad \cdot \quad \cdot \quad \cdot \\ & E \cos \{[\omega\tau + N\omega T + \alpha]\} \end{aligned}$$

Therefore, in effect, just as in the coherent memory filter of FIG. 1, the output signal of the coherent memory filter of FIG. 4 is the result of the combination of a multiplicity of stored signals which are successively delayed by preselected equal time intervals T. Further, as before indicated, the phase of each of these stored signals is adjusted in synchronism at the rate specified by the invention. It might be noted that factors of $2\pi$ have been neglected for convenience of explanation.

A pictorial representation of the manner in which phase alignment of all the stored phase-adjusted signals occurs in the coherent memory filter of FIG. 4 is shown in FIG. 6. In order to better illustrate the occurrence of phase alignment the signal phases as shown were adjusted by multiples of $2\pi$.

In the coherent memory filter of FIG. 4 wave reinforcement reoccurs during each circulation period. It is characteristic of the invention that the amount of coherent integration and therefore the signal-to-noise enhancement provided increases with the number of signal circulations. Thus the total time of signal processing is dictated by the selectivity required in the output signal.

An advantage of the coherent memory filter of FIG. 4 lies in that it may be instantly cleared to be available for successive operations. Such clearing is effected by the provision of a switch 16 in the storage loop. Thus, for example, if it is desired to apply a new signal to an empty filter, the switch 16 is opened to discharge the contents of the storage loop while the new signal is simultaneously applied thereto.

Another embodiment of the invention similar to that of FIG. 4 will now be described with reference to FIGS. 7 and 8. In the embodiment of FIG. 4 phase shifting is effected by heterodyning within the storage loop. Since two of the required characteristics of a memory loop are extreme phase linearity and flatness in amplitude versus frequency response, heterodyning within the loop makes necessary the presence of network elements such as filters. The inherent characteristics of such network elements make it difficult to comply with the specifications established for the loop. It is possible to avoid any frequency conversions within the loop by employing the apparatus of FIG. 7.

Figure 7:
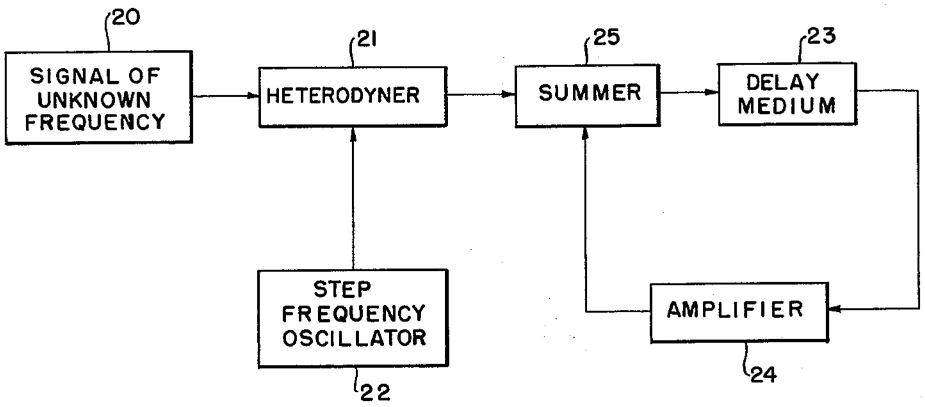
FIG. 7 is a block diagram of a further alternate embodiment of a coherent memory filter in accordance with the invention.
Figure 8:
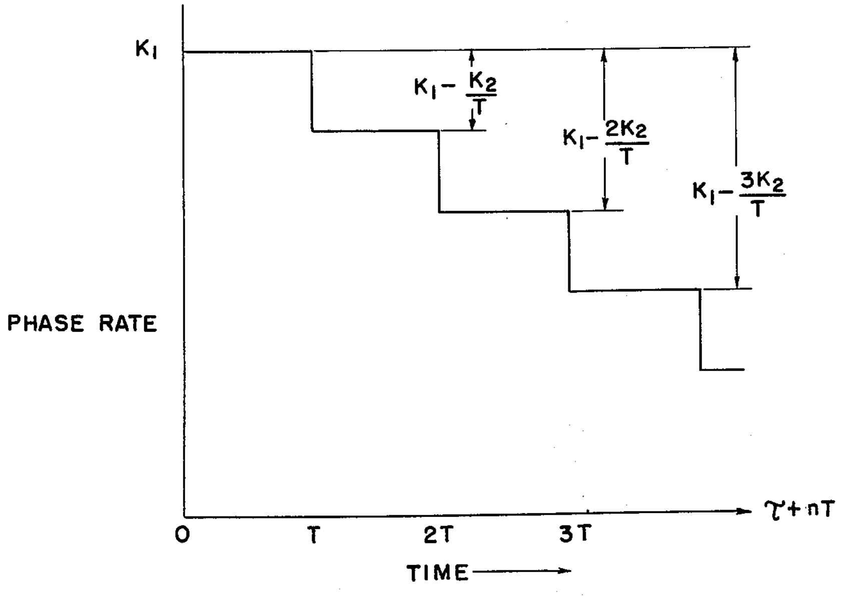
FIG. 8 is a graphical representation of input signal phase rate adjustment as effected in the coherent memory filter of FIG. 7.

In FIG. 7 phase shifting of the input signal 20 is effected outside of the storage loop. The phase shifting means is accordingly adapted to adjust in synchronism the phase of the input signal during successive equal time intervals T at a rate $$k_1 - \frac{nK_2}{T}$$

where:

$n$ is the number of complete elapsed time intervals T,
$K_1$ is any number, and
$K_2$ is any integer.

Advantageously this may be accomplished by a heterodyner 21 having a phase adjustment signal from a local oscillator 22 applied thereto. In order to effect such input signal phase adjustment, the frequency of the local oscillator signal must change with phase continuity at the end of each successive time interval T by an amount proportional to 1/T. This requires that the frequency of the phase adjustment signal change as a staircase function as, for example, illustrated in FIG. 8.

The input signal so adjusted in phase is applied to a storage loop, shown in this embodiment as a delay medium 23, an amplifier 24, and a summing circuit 25. This storage loop must have a delay time equal to $K_3T$, where $K_3$ is any positive integer. Advantageously the net gain of the storage loop is unity.

In this way the input signal is again divided into portions which are successively delayed by equal time intervals and which are combined within a storage loop. Further, the phase of each of these signal portions is adjusted in synchronism at a rate which is a linear function of the delay time experienced by that signal portion, the linear function for each portion being the same. Therefore, signal processing as prescribed occurs.

A preferred embodiment of the invention has been described. Various changes and modifications may be made in the scope of the invention as set forth in the appended claims. For example, the storage medium may be made broadband so that many integration channels may be accommodated within one coherent memory filter.

We claim:

1. A coherent memory filter for processing an input signal which comprises a storage medium, means for applying said input signal to said storage medium, said medium being adapted to present simultaneously a multiplicity of stored signal reproductions of said input signal which are successively delayed by preselected time intervals, summing circuitry for combining said multiplicity of stored signals to cause wave interference producing an output signal, and phase shifting means adapted to adjust in synchronism the phase of each of said multiplicity of stored signals at a rate which is a linear function of the time delay experienced by that stored signal, said linear function being the same for all said stored signals, whereby constructive reinforcement occurs signifying coherent integration and producing amplitude peaks in said output signal at instants of time indicative of the frequency components contained in the input signal.

2. A coherent memory filter in accordance with claim 2 in which said storage medium is adapted to present simultaneously a multiplicity of stored signal reproductions which are successively delayed by preselected equal time intervals.

3. A coherent memory filter for processing an input signal which comprises a delay medium having a multiplicity of outputs, means for applying said input signal to said delay medium, said delay medium being adapted to produce at each output a stored signal reproduction of said input signal, the multiplicity of stored signals thus produced being successively delayed by preselected time intervals, a corresponding multiplicity of synchronized phase shifting means, each connected to a separate and different one of said delay medium outputs respectively to be responsive to the stored signal thereat, each said phase shifting means being adapted to adjust the phase of the said stored signal applied thereto at a rate which is a linear function of the time delay experienced by that stored signal, said linear function being the same for all said stored signals, and summing circuitry connected in common to the outputs of all of said phase shifting means for combining the phase-adjusted stored signals to cause wave interference producing an output signal, whereby constructive reinforcement occurs signifying coherent integration and producing amplitude peaks in said output signal at instants of time indicative of the frequency components contained in the input signal.

4. A coherent memory filter for processing an input signal which comprises a delay medium having a multiplicity of outputs, means for applying said input signal to said delay medium, said delay medium being adapted to produce at each output a stored signal reproduction of said input signal, the multiplicity of stored signals thus produced being successively delayed by preselected time intervals, a corresponding multiplicity of heterodyning circuits, each connected to a separate and different one of said delay medium outputs respectively to be responsive to the stored signal thereat to adjust the phase thereof, means for applying a separate and different phase adjustment signal to each said heterodyning circuit respectively, the frequency of each said phase adjustment signal being a linear function of the time delay experienced by the stored signal applied to the heterodyning circuit associated therewith, said linear function being the same for all said stored signals, said phase adjustment signals being synchronized such that at some instant in time they all simultaneously pass through the same phase angle, and summing circuitry connected in common to the outputs of all of said heterodyning circuits for combining the phase-adjusted stored signals to cause wave interference producing an output signal, whereby constructive reinforcement occurs signifying coherent integration and producing amplitude peaks in said output signal at instants of time indicative of the frequency components contained in the input signal.

5. A coherent memory filter for processing an input signal which comprises a storage loop having a delay time T, means for applying said input signal to said storage loop, and means for adjusting in synchronism the phase of equal successive portions of said input signal, the duration of said portions being equal to $T/K$, where K is any positive integer, at a rate of change equal to a constant plus an integral multiple of $n/T$, where $n$ is an integer representative of the order in succession of the signal portion being adjusted, whereby said input signal entering said loop is continuously combined with stored phase-adjusted signals in said loop to produce coherent integration at instants of time indicative of the frequency components contained in the input signal.

6. A coherent memory filter for processing an input signal which comprises a storage loop, means for applying said input signal to said storage loop, and means within said storage loop for adjusting the phase of said input signal as it passes through said loop upon each circulation therethrough at a rate of change which is a multiple of the reciprocal of the storage loop delay time, whereby said input signal entering said loop is continuously combined with stored phase-adjusted signals in said loop to produce coherent integration at certain instants of time during each circulation period, said instants being indicative of the frequency components contained in the input signal.

7. A coherent memory filter in accordance with claim 6 in which said storage loop includes means for providing unity met gain around said loop.

8. A coherent memory filter for processing an input signal which comprises a storage loop including a delay medium having input and output means, said input means being connected to be responsive to said input signal, and a feedback loop connecting said output means to said input means, said feedback loop having included therein phase shifting means for adjusting the phase of said input signal as it passes through said storage loop upon each circulation therethrough at a rate of change which is a multiple of the reciprocal of the delay time in said storage loop, and summing circuitry connected between the output of said phase shifting means and the said delay medium input means to continuously combine stored phase-adjusted signals in said storage loop with said input signal, thereby to produce coherent integration at certain instants of time during each circulation period, said instants being indicative of the frequency components contained in the input signal.

9. A coherent memory filter in accordance with claim 8 in which said feedback loop further includes therein amplifier circuitry having a gain preselected to provide unity net gain around said storage loop.

10. A coherent memory filter for processing an input signal comprising a storage loop including a delay medium having input and output means, said input means being connected to be responsive to said input signal, a feedback loop connecting said output means to said input means, said feedback loop having included therein heterodyning circuitry for adjusting the phase of said input signal as it passes through said storage loop upon each circulation therethrough, and summing circuitry connected between the output of said heterodyning circuitry and the said delay medium input means to continuously combine stored phase-adjusted signals in said storage loop with said input signal, and circuit means for applying a phase adjustment signal to said heterodyning circuitry, the frequency of said phase adjustment signal being a multiple of the reciprocal of the delay time in said storage loop, whereby coherent integration occurs at certain instants of time during each circulation period, said instants being indicative of the frequency components contained in the input signal.

11. A coherent memory filter in accordance with claim 10 in which said feedback loop further includes therein amplifier circuitry having a gain preselected to provide unity net gain around said storage loop.

12. A coherent memory filter for processing an input signal comprising phase shifting means connected to be responsive to said input signal, said phase shifting means being adapted to adjust in synchronism the phase of said input signal during successive equal time intervals T at a rate equal to $$K_1 - \frac{K_2 n}{T}$$

where:

$n$ is the number of complete elapsed time intervals T, $K_1$ is any number, and $K_2$ is any integer, a storage loop having a delay time $K_3T$, where $K_3$ is any integer, and circuit means for applying the phase-adjusted signal output of said phase shifting means to said storage loop, whereby said phase-adjusted signals combine in said storage loop to produce coherent integration at instants of the time indicative of the frequency components contained in said input signal.

13. A coherent memory filter for processing an input signal comprising heterodyning circuitry connected to be responsive to said input signal to adjust the phase thereof, circuit means for applying a phase adjustment signal to said heterodyning circuitry, said circuit means being adapted to change the frequency of said phase adjustment signal with phase continuity at the end of each successive time interval T by an amount proportional to $1/T$, a storage loop having a delay time KT, where K is any integer, and circuit means for applying the phase-adjusted signal output of said heterodyning circuit to said storage loop, whereby said phase-adjusted signals combine in said storage loop to produce coherent integration at instants of time indicative of the frequency components contained in said input signal.

14. A coherent memory filter for processing an input signal, which comprises a storage medium, means for applying said input signal to said storage medium, said medium being adapted to present simultaneously a multiplicity of stored signal reproductions of said input signal which are successively delayed by preselected time intervals, summing circuitry for combining said multiplicity of stored signals to cause wave interference producing an output signal, and phase shifting means adapted to adjust the phase of each of said multiplicity of stored signals by a time-varying amount which is a linear function of the time delay experienced by that stored signal, said linear function being the same for all said stored signals.

15. A coherent memory filter for processing an input signal, which comprises means for presenting simultaneously a multiplicity of reproductions of said input signal which are successively delayed by preselected time intervals, summing circuitry for combining said multiplicity of signal reproductions to cause wave interference producing an output signal, and phase shifting means adapted to adjust the phase of each of said multiplicity of signal reproductions by a time-varying amount which is a linear function of the time delay experienced by that signal reproduction, said linear function being the same for all said signal reproductions.

References Cited in the file of this patent

UNITED STATES PATENTS

| | | |
|---|---|---|
| 2,499,742 | Goodall | Mar. 7, 1950 |
| 2,566,876 | Dome | Sept. 4, 1951 |
| 2,612,633 | Cutler | Sept. 30, 1952 |
| 2,651,673 | Fredendall | Sept. 8, 1953 |
| 2,666,181 | Courtillot | Jan. 12, 1954 |
| 2,711,516 | Fredendall | June 21, 1955 |
| 2,759,044 | Oliver | Aug. 14, 1956 |
| 2,800,580 | Davies | July 23, 1957 |
| 2,841,704 | Sunstein et al. | July 1, 1958 |
| 2,854,641 | Daguier | Sept. 30, 1958 |
| 2,896,162 | Berger et al. | July 21, 1959 |
| 2,920,289 | Meyer | Jan. 5, 1960 |

FOREIGN PATENTS

| | | |
|---|---|---|
| 736,602 | Great Britain | Sept. 14, 1955 |
| 745,908 | Great Britain | Mar. 7, 1956 |
| 747,502 | Great Britain | Apr. 4, 1956 |
| 212,753 | Australia | Jan. 20, 1958 |

OTHER REFERENCES

Journal of Applied Physics, August 1954, pages 1025–1036.

"Correspondence," Proceedings of the I.R.E., June 1956, page 820.